United States Patent
Yang et al.

(10) Patent No.: US 8,964,704 B2
(45) Date of Patent: Feb. 24, 2015

(54) SYSTEM AND METHOD OF ENHANCED PILOTS FOR IMPROVED MOBILE STATION POSITIONING

(71) Applicant: Via Telecom, Inc., San Diego, CA (US)

(72) Inventors: Hong-Kui Yang, San Diego, CA (US); Shu Wang, San Diego, CA (US); Jian Gu, Beijing (CN)

(73) Assignee: Via Telecom Co., Ltd., George Town (KY)

( * ) Notice: Subject to any disclaimer, the term of this patent is extended or adjusted under 35 U.S.C. 154(b) by 202 days.

(21) Appl. No.: 13/853,113

(22) Filed: Mar. 29, 2013

(65) Prior Publication Data

US 2014/0295875 A1  Oct. 2, 2014

(51) Int. Cl.
*H04B 7/216* (2006.01)
*H04W 4/02* (2009.01)

(52) U.S. Cl.
CPC .................................. *H04W 4/023* (2013.01)
USPC ......................................................... 370/335

(58) Field of Classification Search
None
See application file for complete search history.

(56) References Cited

U.S. PATENT DOCUMENTS

| 2009/0290502 | A1* | 11/2009 | Tinnakornsrisuphap et al. ........................ 370/252 |
| 2010/0216450 | A1* | 8/2010 | Fujishima et al. ......... 455/422.1 |
| 2013/0229961 | A1* | 9/2013 | Ma et al. ....................... 370/311 |

* cited by examiner

*Primary Examiner* — Duc C Ho
(74) *Attorney, Agent, or Firm* — Gary Stanford; James W. Huffman

(57) ABSTRACT

A system and method of enhancing transmission of highly detectable pilots (HDPs). At least one base station transmits at least one cellular signal in which each cellular signal includes repetitive HDP cycles. Each HDP cycle has a duration of N power control groups (PCGs) and includes an HDP period having a duration of M PCGs in which N is greater than M. Traffic and overhead channels are gated during each HDP period. An enhanced HDP symbol is transmitted during a selected HDP period for each set of X HDP cycles of each cellular signal. For single carrier configurations, only one enhanced HDP is transmitted at a time, or multiple HDPs are transmitted in different directions. Standard 1x pilots may be transmitted. The enhanced HDP may be a boosted standard 1x pilot or an additional standard HDP pilot. Multicarrier configurations are described with PCG or sub-chip and/or phase offsets.

23 Claims, 9 Drawing Sheets

| FIELD | LENGTH (BITS) |
|---|---|
| PILOT_PN | 9 |
| CONFIG_MSG_SEQ | 6 |
| HDP_PERIOD | 2 |
| HDP_WALSH_COVER | 6 |
| HDP_SECTOR_COUNT | 7 |

701

| FIELD | LENGTH (BITS) |
|---|---|
| HDP_PILOT_PN | 9 |
| PLANNED_OR_RANDOM_COLORING | 1 |
| HDP_COLOR OFFSET | 0 OR 4 |
| SEED_SAME_AS_PREVIOUS | 0 OR 1 |
| CELL_SEED_PN_SAME_AS_THIS_PN | 0 OR 1 |
| HDP_CELL_SEED_PN | 0 OR 9 |
| HDP_CELL_SEED_EXTRA | 0 OR 4 |
| HDP_SECTOR_INDEX | 0 OR 3 |
| MULTICARRIER_SUPPORT | 1 |
| MULTICARRIER_COUNT | 1 |

703

| FIELD | LENGTH (BITS) |
|---|---|
| CDMA_CHANNEL_NUMBER | 2 |
| PCG_OFFSET | 2 |
| CARRIER_PHASE_OFFSET | 6 |
| CHIP_OFFSET | 6 |

| FIELD | LENGTH (BITS) |
|---|---|
| HDP_PILOT_PN | 9 |
| PLANNED_OR_RANDOM_COLORING | 1 |
| HDP_COLOR OFFSET | 0 OR 4 |
| SEED_SAME_AS_PREVIOUS | 0 OR 1 |
| CELL_SEED_PN_SAME_AS_THIS_PN | 0 OR 1 |
| HDP_CELL_SEED_PN | 0 OR 9 |
| HDP_CELL_SEED_EXTRA | 0 OR 4 |
| HDP_SECTOR_INDEX | 0 OR 3 |
| MULTICARRIER_MIN_PCG_OFFSET | 4 |
| MULTICARRIER_MIN_PHASE_OFFSET | 6 |
| MULTICARRIER_MIN_CHIP_OFFSET | 6 |

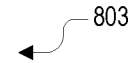

FIG. 8

| FIELD | LENGTH (BITS) |
|---|---|
| HDP_PILOT_PN | 9 |
| PLANNED_OR_RANDOM_COLORING | 1 |
| HDP_COLOR OFFSET | 0 OR 4 |
| SEED_SAME_AS_PREVIOUS | 0 OR 1 |
| CELL_SEED_PN_SAME_AS_THIS_PN | 0 OR 1 |
| HDP_CELL_SEED_PN | 0 OR 9 |
| HDP_CELL_SEED_EXTRA | 0 OR 4 |
| HDP_SECTOR_INDEX | 0 OR 3 |
| MULTICARRIER_SUPPORT | 1 |
| MULTICARRIER_PATTERN | 2 |
| MULTICARRIER_CHANNELS | 4 |

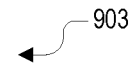

FIG. 9

SYSTEM AND METHOD OF ENHANCED PILOTS FOR IMPROVED MOBILE STATION POSITIONING

CROSS-REFERENCE TO RELATED APPLICATIONS

This application claims the benefit of the following U.S. Provisional application, which is herein incorporated by reference for all intents and purposes.

| SERIAL NUMBER | FILING DATE | TITLE |
| --- | --- | --- |
| 61/227,077 (VTU.12-0019-US) | Mar. 29, 2012 | ENHANCED PILOTS FOR POSITIONING |

BACKGROUND OF THE INVENTION

1. Field of the Invention

This invention relates in general to the field of wireless communications, and more particularly to a system and method of enhanced pilots for improved mobile position estimation in a wireless network.

2. Description of the Related Art

Mobile location or positioning services in a wireless communication system are useful for a variety of applications including emergency, commercial and personal applications. A mobile station may use any one of a variety of methods for determining its position. Although a Global Positioning System (GPS) using measurements from orbiting satellites may be a more accurate method of determining location, GPS may not be supported by the mobile station or may otherwise be non-functional in a local area in which line of sight to at least one satellite is not available.

Advanced Forward Link Trilateration (AFLT) is a mobile positioning method developed for cellular phones using Code Division Multiple Access (CDMA) technology, such as according to the CDMA200 family of third generation (3G) mobile technology standards, generally referred to herein as "1x". According to the AFLT technique, the mobile station gathers cellular signals received from multiple base stations for measuring relative timing delays between the base stations. The collected measurements may then be sent to a nearby base station which calculates a location estimate. To determine location, the mobile station takes timing measurements of received cellular signals from nearby base stations (e.g., cellular towers) and reports the readings back to the network, which are then used to triangulate an approximate location of the mobile station. In general, at least three surrounding base stations may be used to obtain a position determination.

There are many signification factors which may affect AFLT positioning performance using 1x. 1x employs limited transmission bandwidth, such as 1.2288 mega-Hertz (MHz) per carrier (frequency). Cellular communications, including those based on the 1x standard, suffer from various noise sources or distortions, such as multipath propagation phenomenon (in which the same signal transmitted by a base station arrives at the mobile station at different times via multiple paths), co-channel interference and noise, dilution of precision (DOP) or geometric DOP (GDOP) (errors in measurement which affect overall solution), etc. The positioning estimation performance is quantified by "hearability," which is a measure of the number of base stations that are "visible" to the mobile station (exacerbated by the near-far effect), and location accuracy or location error statistics.

A highly detectable pilot (HDP) structure, such as that described in US Patent Application Publication 2010/0074344 by Michael M. Wang et al., published Mar. 25, 2010, provided several benefits including improved hearability and improved positioning accuracy and reliability. The conventional HDP approach, however, added several challenges, including impact to existing or legacy 1x services, implementation cost increases, and positioning estimation delay.

Accordingly, it is desired to provide a method and apparatus that improves upon the conventional HDP approach at reduced cost and providing backwards compatibility with conventional or legacy systems.

SUMMARY OF THE INVENTION

A method of enhancing transmission of highly detectable pilots (HDPs) according to one embodiment includes transmitting, by at least one base station, at least one cellular signal in which each cellular signal includes repetitive HDP cycles and where each HDP cycle has a duration of N power control groups (PCGs). Each HDP cycle includes an HDP period having a duration of M power control groups in which N is greater than M. During the transmitting, the method includes gating traffic and overhead channels during each HDP period of each HDP cycle of each cellular signal. During the transmitting, the method includes transmitting an enhanced HDP symbol during a selected HDP period for each set of X HDP cycles of each cellular signal.

A wireless communication system according to one embodiment of the present invention includes at least one base station that is configured to transmit at least one cellular signal, in which each cellular signal includes repetitive HDP cycles and in which each HDP cycle has a duration of N PCGs. Each HDP cycle includes an HDP period having a duration of M power control groups. Each base station is configured to gate traffic and overhead channels during each HDP period of each HDP cycle of a corresponding cellular signal. Each base station is configured to transmit an enhanced HDP symbol during a selected HDP period for each set of X HDP cycles of a corresponding cellular signal.

BRIEF DESCRIPTION OF THE DRAWINGS

These and other objects, features, and advantages of the present invention will become better understood with regard to the following description, and accompanying drawings where:

FIG. 7 is a diagram of information transmitted by the base station to the mobile station of FIG. 1 in an HDP parameters message for communicating multicarrier information;

FIG. 8 is a table which may be transmitted by the base station to the mobile station of FIG. 1 in the HDP parameters message to provide the mobile station with the HDP channel transmit information for the sectors according to an alternative multicarrier embodiment;

FIG. 9 is a table which may be transmitted by the base station to the mobile station of FIG. 1 in the HDP parameters message to provide the mobile station with the HDP channel transmit information for the sectors according to another alternative multicarrier embodiment.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
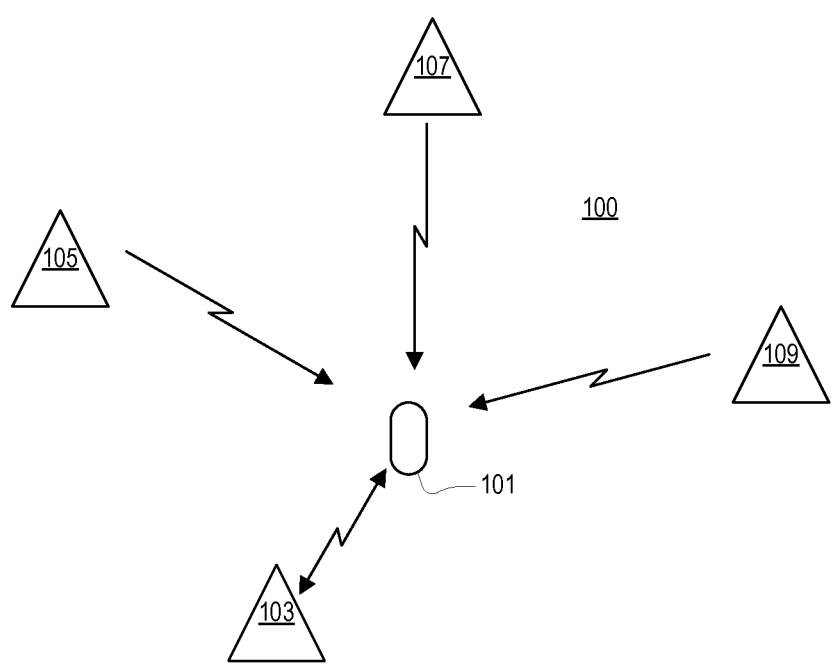
FIG. 1 is a figurative diagram illustrating a wireless communication system implemented according to an embodiment of the present invention including a mobile station and multiple base stations.

FIG. 1 is a figurative diagram illustrating a wireless communication system 100 implemented according to an embodiment of the present invention including a mobile station 101 and multiple base stations 103, 105, 107 and 109. The mobile station 101 may be implemented as one of many different configurations, such as a cellular phone (or cell phone), handset, mobile phone, smart phone, personal digital device or personal digital assistant (PDA), laptop computer, etc. The base stations 103, 105, 107 and 109 (103-109) may be implemented in any suitable manner, such as mounted on cellular communication towers or the like as understood by those of ordinary skill in the art. The base stations 103-109 may be sector-based or cell-based and may be implemented to support a radial sector (directional sector) or to support a cellular range (omni-sector). The base stations 103-109 may have different locations, although some base stations in a given configuration may be co-located, such as, for example, mounted on the same cell tower. Although only four base stations are shown, it is understood that any number of base stations may be located within a given area or region within hearability range of the mobile station 101.

The wireless communication system 100 may be configured so that the mobile station 101 may communicate with any one of the base stations 103-109, such as according to CDMA communications. As shown, the base station 103 serves as the primary or servicing base station for the mobile station 101 in which a bidirectional communication link has been established between the mobile station 101 and the base station 103. As the mobile station 101 moves within the local area or region, primary communications may be handed off to any of the other base stations 105-109 or to other base stations (not shown) in the area or surrounding areas, in which the handoff function may be controlled by a base station controller or the like (not shown).

In the illustrated embodiment, the mobile station 101 is capable of receiving, decoding and utilizing cellular signals from any of the other base stations 105-109. In a CDMA configuration, for example, the cellular signal is transmitted in a forward link (from base station to one or more mobile stations) and may include pilot signals or symbols as further described herein. In one embodiment, the mobile station 101 and each of the base stations 103-109 communicate according to CDMA in which each base station employs a different carrier frequency or a different code sequence such as a different pseudo random noise (PN) code operative within the same carrier frequency. In this manner, the mobile station 101 is capable of distinguishing information received from each the base stations 103-109 using the different carrier frequencies or the different PN codes decoded from the received information within the cellular signal.

In one embodiment, the wireless communication system 100 uses the AFLT mobile positioning method according to the 1x standard. In this configuration, the mobile station 101 gathers information received from cellular signals from multiple base stations 103-109, such as pilot symbols as further described herein, and measures relative timing delays between the base stations. In one embodiment, a base station, such as the base station 103, may send location information in the form of a cell tower list or the like to the mobile station 101 which uses a trilateration positioning algorithm or the like to calculate the position of the mobile station 101 relative to one or more of the local base stations. In this case, since the base stations 103-109 are stationary and have location information using GPS or the like, the list includes specific location information for each base station. The base stations 103-109 may communicate with each other either directly or via the base station controller. In an alternative embodiment, the mobile station 101 sends the collected measurements to a nearby base station, such as the base station 103, which either performs the trilateration positioning algorithm or forwards the measurements to a remote server or the like (not shown). The base station 103 or the remote server calculates a location estimate which may then be transmitted back to the mobile station 101.

The cellular signals described herein are subdivided into a consecutive series of highly detectable pilot (HDP) cycles of approximately the same duration of an integer number "N" of power control groups (PCGs) in which each PCG has a predetermined duration of time. Each HDP cycle includes one HDP period having a duration of an integer number "M" of PCGs in which M is less than N. In one embodiment, each PCG has a duration of 1.25 milliseconds (ms). In one embodiment, M is 1 or 2 PCGs and is much less than N, which may be tens or hundreds of PCGs or more. The traffic and overhead channels are gated during each HDP period. In several embodiments, the HDP periods may be spaced apart at approximately equal intervals between successive HDP cycles. Alternatively, a variable or random pattern may be defined in which the HDP period occurs at variable or random offsets.

The HDP cycles are grouped into a set of "X" HDP cycles in which one enhanced HDP pilot symbol is transmitted or turned on during a selected HDP period within each set of X HDP cycles as further described herein. X is a suitable positive integer that may be determined for each implementation.

Figure 2:
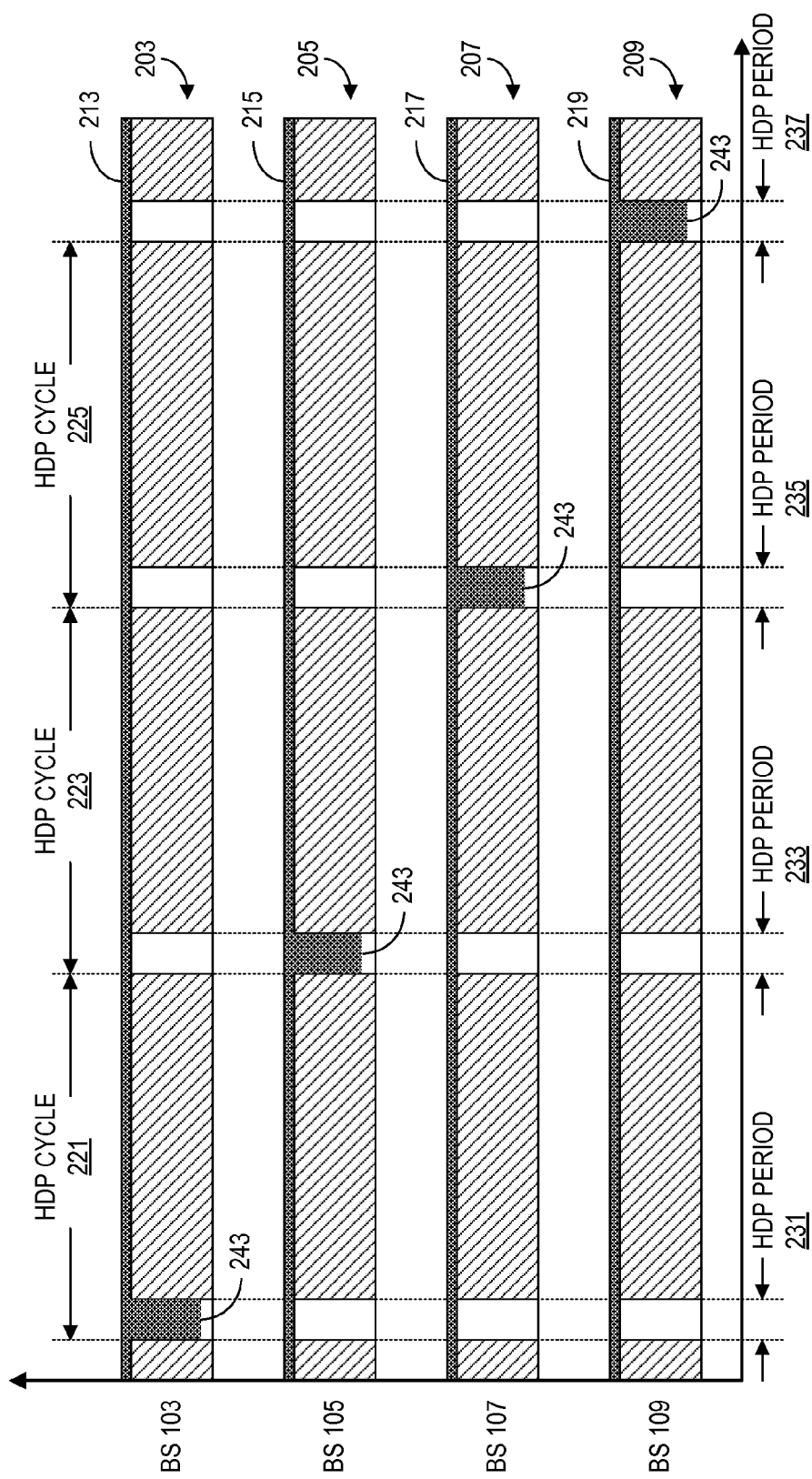
FIG. 2 is a timing diagram plotting four transmitted cellular signals by the base stations, respectfully, of FIG. 1 versus time incorporating enhanced HDP symbols implemented according to one embodiment of the present invention.

FIG. 2 is a timing diagram plotting four transmitted cellular signals 203, 205, 207 and 209 (203-209) by the base stations 103-109, respectfully, versus time incorporating "enhanced" highly detectable pilot (HDP) symbols implemented according to one embodiment of the present invention. The term "enhanced" as used herein refers to improved transmission and detection methods of HDP symbols for improved signal integrity to further improve positioning estimates of mobile stations including the mobile station 101. Each of the cellular signals 203-209 includes the standard 1x pilot symbol 213, 215, 217 and 219 (213-219), respectively, which are continuously transmitted at a predetermined power level. A "standard" 1x pilot refers to any pilot symbol defined in the 1x standard. Each of the cellular signals 203-209 includes repeating HDP cycles of N PCGs in which each PCG has a predetermined duration of time. In the illustrated embodiments, only 3 consecutive cycles 221, 223 and 225 are shown, in which each cycle includes an HDP period having a duration of M.

The HDP period may occur at any selected time within each cycle and the HDP periods are temporally aligned the base stations 103-109. In the illustrated embodiment, each of the cellular signals 203-209 transmitted by the base stations 103-109 includes repeating HDP cycles of N PCGs having an initial HDP period of a duration of M PCGs followed by a remaining period of duration N–M PCGs. It is noted that M is sufficiently small compared to N to reduce the overhead of transmission of the enhanced pilot symbols. As shown, the first HDP cycle 221 includes an HDP period 231, the second HDP cycle 223 includes an HDP period 233, and the third HDP cycle 225 includes an HDP period 235. The next HDP cycle includes an HDP period 237, and so on. The HDP cycles repeat in this manner in which the signals 203-209 are synchronized so that the HDP periods are temporally aligned, meaning that the HDP periods occur substantially at the same time.

During each of the HDP periods (221, 223, 225, etc.), only one of the base stations 103-109 turns on or otherwise transmits an enhanced HDP symbol while each of the base stations "gate" their remaining traffic and overhead channels. As used herein, the term "gate" and its various forms means that the signals are blanked out and not transmitted. As shown, the cellular signals are illustrated with diagonal line shading whereas gated periods are shown as blank periods during each HDP period. During the first HDP period 221, the base station 103 gates its traffic and overhead channels and further transmits an enhanced HDP symbol 243 on the cellular signal 203. During the first HDP period 221, the remaining base stations 105-109 gate their corresponding traffic and overhead channels and do not transmit an enhanced HDP symbol. During the second HDP period 223, the base station 105 gates its traffic and overhead channels and further transmits the enhanced HDP symbol 243 on the cellular signal 205, and the remaining base stations 103, 107 and 109 gate their corresponding traffic and overhead channels and do not transmit an enhanced HDP symbol. During the third HDP period 225, the base station 107 gates its traffic and overhead channels and further transmits the enhanced HDP symbol 243 on the cellular signal 207, and the remaining base stations 103, 105 and 109 gate their corresponding traffic and overhead channels and do not transmit an enhanced HDP symbol. The base station 109 gates its traffic and overhead channels and further transmits the enhanced HDP signal 243 on the cellular signal 209 during a following HDP period, whereas the remaining base stations 103, 105 and 107 gate their corresponding traffic and overhead channels.

In the embodiment illustrated in FIG. 2, each enhanced HDP symbol 243 is implemented by increasing or boosting the power of the standard 1x pilot symbol. Thus, each of the base stations 103-109 continuously transmits its standard 1x pilot symbol and gates its traffic and overhead channels during each HDP period. Only one of the base stations transmits an enhanced HDP symbol at a time during the HDP periods by boosting its standard 1x pilot symbol.

The embodiment of FIG. 2 provides several advantages over conventional HDP configurations. The standard 1x pilot symbol is continuously transmitted by each of the base stations 103-109 which provides improved backwards compatibility with legacy (e.g., conventional) systems that use the standard 1x pilot symbol for positioning. The HDP periods are relatively short so that the gated traffic and overhead channels and the power-boosted HDP 1x pilot symbols have minimal impact on legacy systems. The gating of the traffic and overhead channels with one enhanced HDP on symbol improves reception accuracy at the mobile station 101 by increasing the signal-to-noise (SNR) of the HDP symbol. The impact on the base stations 103-109 is relatively minimal since each may be modified by simply gating traffic and overhead channels during each HDP period and by selectively boosting the power of the existing standard 1x pilot symbol during selected HDP periods.

The mobile station 101 is configured to detect the enhanced HDP symbols 243 during each of the HDP periods. The gating of the traffic and overhead signals and the transmission of only one enhanced HDP symbol at a time improves the SNR of the HDP symbol providing improved timing measurement for each base station including more distant base stations. The improved signal integrity improves relative timing measurements which in turn provide a more accurate position estimation calculation.

Figure 3:
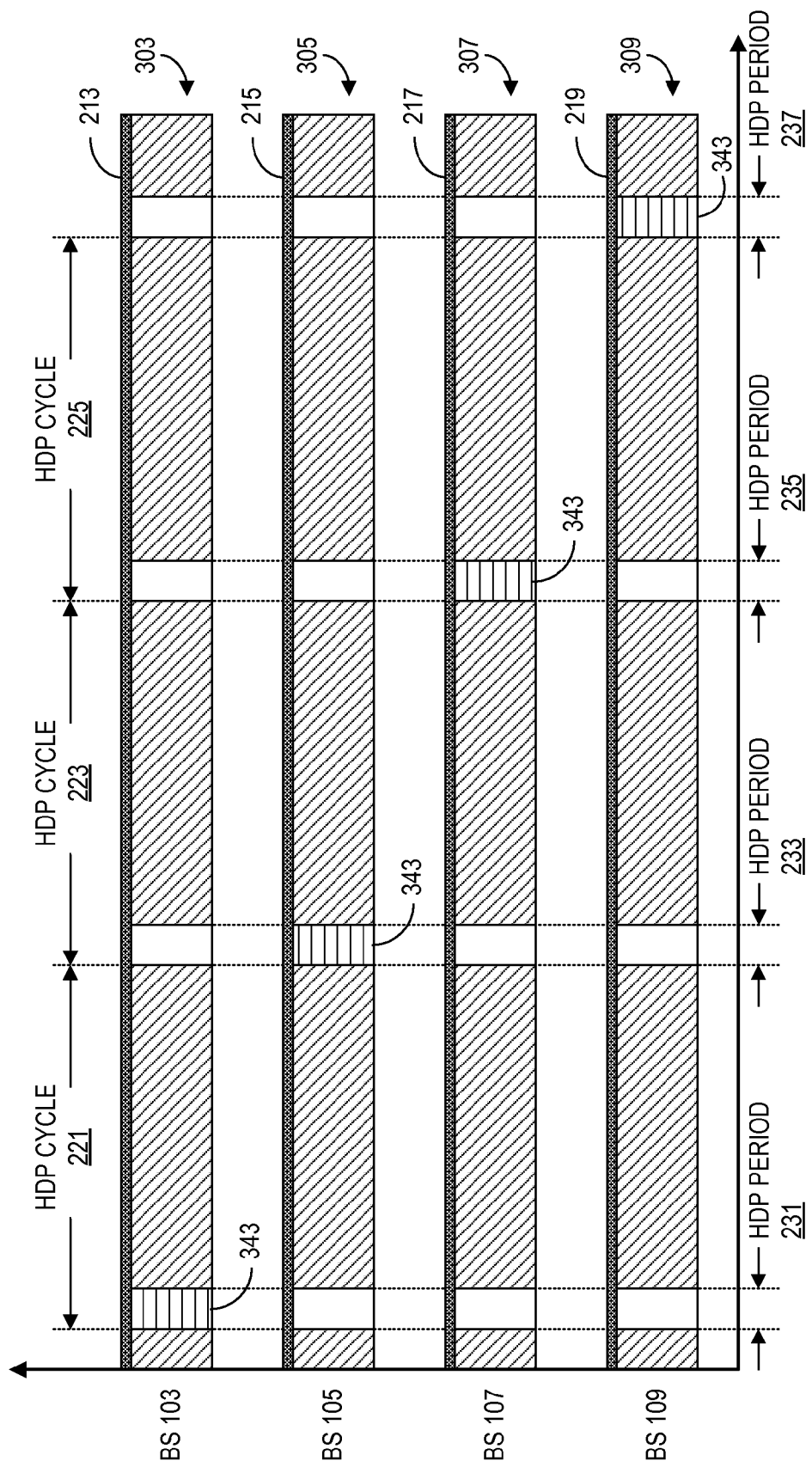
FIG. 3 is a timing diagram plotting four transmitted cellular signals by the base stations, respectfully, of FIG. 1 versus time incorporating enhanced HDP symbols implemented according to a hybrid HDP embodiment of the present invention.

FIG. 3 is a timing diagram plotting four transmitted cellular signals 303, 305, 307 and 309 (303-309) by the base stations 103-109, respectfully, versus time incorporating enhanced HDP symbols implemented according to a hybrid HDP embodiment of the present invention. The hybrid HDP embodiment of FIG. 3 is substantially similar to the enhanced HDP configuration of FIG. 2 in which the cellular signals 303-309 are substantially similar to the cellular signals 203-209. Each of the cellular signals 303-309 have temporally aligned HDP periods 231, 233, 235, 237, etc., in a similar manner, the standard 1x pilot symbols 213, 215, 217, and 219 are continuously transmitted in a similar manner, the traffic and overhead signals are gated for each of the HDP periods in a similar manner, and only one base station transmits an enhanced HDP on symbol at a time in a similar manner.

In the embodiment of FIG. 3, however, the enhanced HDP symbol is configured as a standard HDP symbol 343 transmitted along with the standard 1x pilot symbol for the hybrid configuration. A "standard" HDP symbol is any HDP pilot symbol suitable for the particular cellular communication implementation. Thus, rather than boosting the standard 1x pilot symbol, the standard 1x pilot symbol is transmitted at normal power and a standard HDP symbol 343 is transmitted in addition during each HDP period. As shown, the base station 103 transmits the standard HDP symbol 343 during the HDP period 231, the base station 105 transmits the standard HDP symbol 343 during the HDP period 233, the base station 107 transmits the standard HDP symbol 343 during the HDP period 235, and the base station 109 transmits the standard HDP symbol 343 during the HDP period 237. The remaining traffic and overhead signals of each of the base stations 103-109 are gated in similar manner during each of the HDP periods for enhanced transmission and reception of the HDP symbols.

Figure 4:
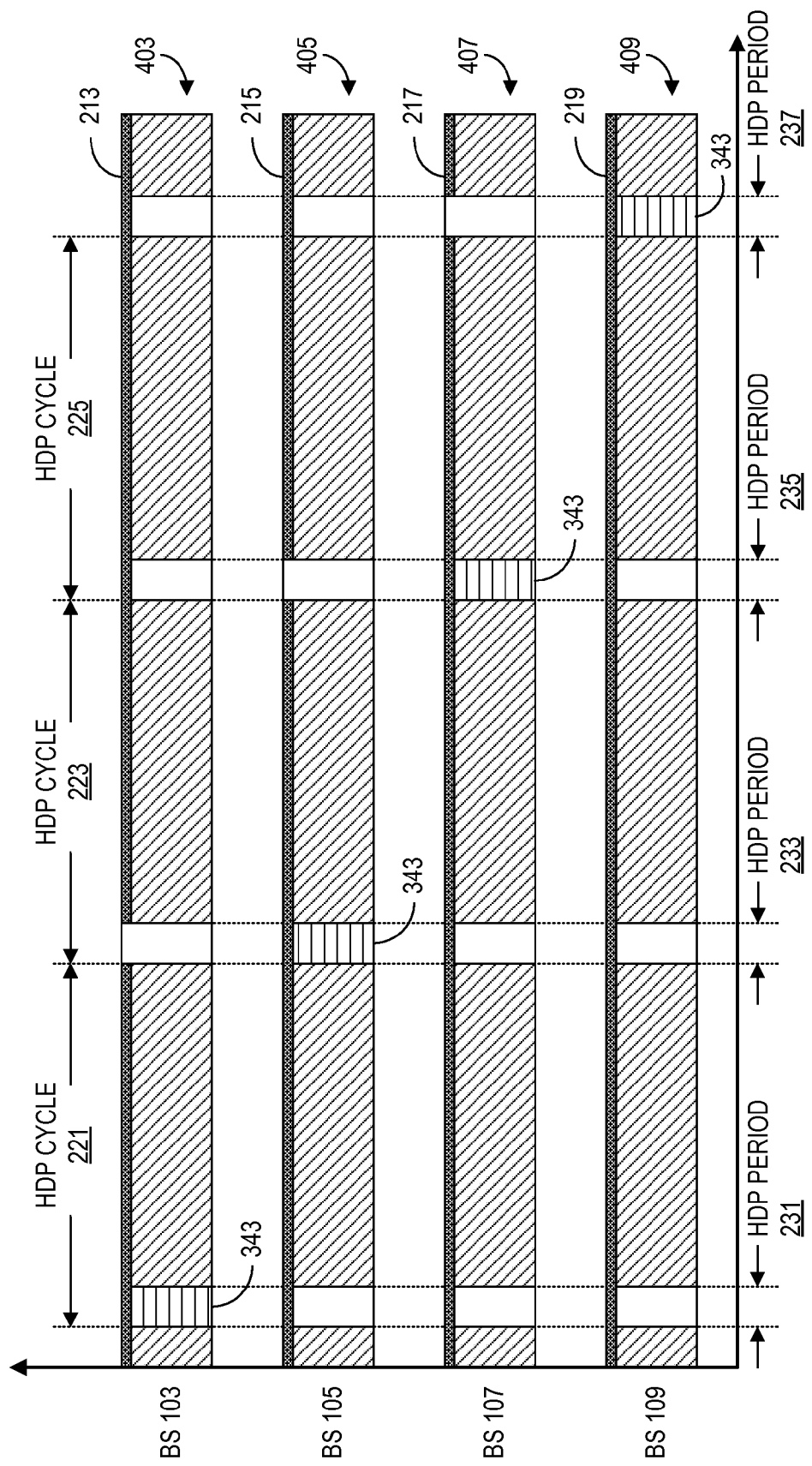
FIG. 4 is a timing diagram plotting four transmitted cellular signals by the base stations, respectfully, of FIG. 1 versus time incorporating enhanced HDP symbols implemented according to an alternative hybrid HDP embodiment of the present invention.

FIG. 4 is a timing diagram plotting four transmitted cellular signals 403, 405, 407 and 409 (403-409) by the base stations 103-109, respectfully, versus time incorporating enhanced HDP symbols implemented according to an alternative hybrid HDP embodiment of the present invention. The hybrid HDP embodiment of FIG. 4 is substantially similar to the enhanced HDP configuration of FIG. 3. Each of the cellular signals 403-409 have temporally aligned HDP periods 231, 233, 235, 237, etc., in a similar manner, the traffic and overhead signals are gated for each of the HDP periods in a similar manner, and only one base station transmits an enhanced HDP symbol at a time in a similar manner.

In the embodiment of FIG. 4, however, the standard 1x pilot symbols are selectively gated during selected HDP periods. In particular, for the cycle immediately following a prior cycle in which the standard HDP symbol 343 was transmitted, each base station additionally gates its standard 1x pilot symbol for the corresponding HDP period. Other than the temporary blanking during the selected HDP periods, the standard 1x pilot symbols are continuously transmitted. As shown, for example, the base station 103 transmits the standard HDP symbol 343 during the HDP period 231 along with the standard 1x pilot symbol during the HDP cycle 221, and then gates the standard 1x pilot symbol during the HDP period 233 of the next HDP cycle 223. Similarly, the base station 105 transmits the standard HDP symbol 343 during the HDP period 233 along with the standard 1x pilot symbol during the HDP cycle 223, and then gates the standard 1x pilot symbol during the HDP period 235 of the next HDP cycle 225. Operation repeats in this manner for the participating base stations.

The hybrid HDP configurations of FIGS. 3 and 4 provide good backward compatibility with conventional wireless systems. As described above with relation to the embodiment of FIG. 2, legacy mobile stations use the standard 1x pilot symbol for positioning. The impact to legacy 1x mobile stations in acquisition and searching is minimized. Newer mobile stations supporting a system and method of enhanced pilots for improved mobile station positioning as described herein may use both the standard 1x pilot symbol and the standard HDP signal 343 for positioning. The hybrid HDP configurations support both sector-based and cell-base deployments.

In an alternative embodiment of FIG. 4, each standard HDP symbol 343 may be replaced by an enhanced HDP symbol 243 in which the enhanced HDP symbols are implemented by boosting the power of the standard 1x pilot symbols in a similar manner as previously described.

Figure 5:
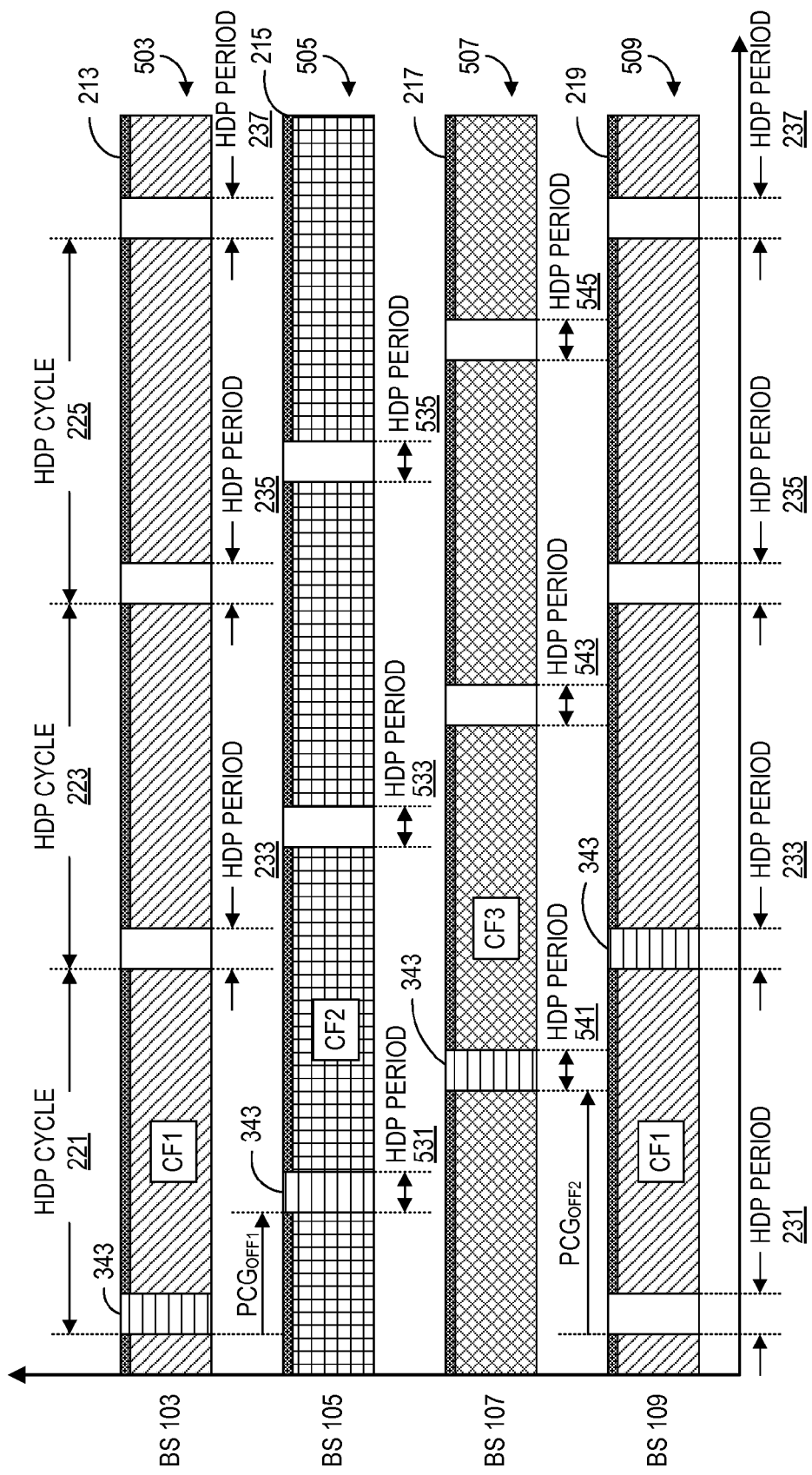
FIG. 5 is a timing diagram plotting four transmitted cellular signals by the base stations, respectfully, of FIG. 1 versus time incorporating enhanced HDP symbols implemented according to an embodiment of the present invention using multiple carriers (multicarrier) with PCG offsets.

FIG. 5 is a timing diagram plotting four transmitted cellular signals 503, 505, 507 and 509 (503-509) by the base stations 103-109, respectfully, versus time incorporating enhanced HDP pilot symbols implemented according to an embodiment of the present invention using multiple carriers (multi-carrier) with PCG offsets. In this case, the standard 1x pilot symbols 213-219 are transmitted for the cellular signals 503-509 as usual but are gated during each HDP period. Also, several of the cellular signals 503-509 are transmitted at different carrier frequencies, although certain of the cellular signals 503-509 may be synchronized and temporally aligned within the same carrier frequency. As shown, base stations 103 and 109 transmit the cellular signals 503 and 509, respectively, at a first carrier frequency CF1. The carrier frequency CF1 is illustrated with diagonal line shading. The base station 105 transmits the cellular signal 505 at a second and different carrier frequency CF2, illustrated with horizontal and vertical line shading. The base station 107 transmits the cellular signal 507 at a third and different carrier frequency CF3, illustrated with cross-hatch line shading.

The cellular signals 503 and 509 are synchronized and temporally aligned within the HDP cycles 221, 223, 225, etc., with corresponding HDP periods 231, 233, 235, 237, etc., in a similar manner previously described. The standard 1x pilot symbol and the traffic and overhead channels are gated during each HDP period of each of the cellular signals 503-509. In this case, the base station 103 transmits the standard HDP symbol 343 on the cellular signal 503 during the HDP period 231, whereas the base station 109 transmits the standard HDP symbol 343 on the cellular signal 503 during its next HDP period 233 for the cellular signals 503 and 509 at the carrier frequency CF1. The base stations 103 and 109 gate the standard 1x pilot symbol and the traffic and overhead channels and do not transmit the standard HDP symbol 343 during the remaining HDP periods 235 and 237. It is understood, however, that the pattern repeats after a selected number of HDP cycles.

The cellular signal 505 transmitted by the base station 105 is generally synchronized with the cellular signal 503 but at a first PCG offset $PCG_{OFF1}$. $PCG_{OFF1}$ is a number of PCGs that may be less than N. The cellular signal 505 includes repeating HDP cycles of N PCGs each including an HDP period with duration of M PCGs and a remaining period with duration N−M PCGs in a similar manner as previously described, but at the first PCG offset $PCG_{OFF1}$ relative to the cellular signal 503. As shown, the cellular signal 505 includes an HDP period 531 after a delay of $PCG_{OFF1}$ relative to the HDP period 231 of the cellular signal 503. The HDP cycles are repeated in similar manner. Thus, the cellular signal 505 includes a subsequent HDP period 533 after a delay of $PCG_{OFF1}$ relative to the HDP period 233 of the cellular signal 503, and includes a another HDP period 535 after a delay of $PCG_{OFF1}$ relative to the HDP period 235 of the cellular signal 503, and so on.

In a similar manner, the cellular signal 507 transmitted by the base station 107 is generally synchronized with the cellular signal 503 but at a second PCG offset $PCG_{OFF2}$. $PCG_{OFF2}$ is also a number of PCGs that may be less than N but may be greater than $PCG_{OFF1}$. The cellular signal 507 also includes repeating HDP cycles of N PCGs each including an HDP period with duration of M PCGs and a remaining period with duration N−M PCGs in a similar manner as previously described, but at the second PCG offset $PCG_{OFF2}$ relative to the cellular signal 503. As shown, the cellular signal 507 includes an HDP period 541 after a delay of $PCG_{OFF2}$ relative to the HDP period 231 of the cellular signal 503. The HDP cycles are repeated in similar manner. Thus, the cellular signal 507 includes a subsequent HDP period 543 after a delay of $PCG_{OFF2}$ relative to the HDP period 233 of the cellular signal 503, and includes a another HDP period 545 after a delay of $PCG_{OFF2}$ relative to the HDP period 235 of the cellular signal 503, and so on. It is understood that additional base stations with the same or different carrier frequencies may be included.

The base station 103 transmits a standard HDP symbol 343 during the HDP period 231 of the cellular signal 503 at carrier frequency CF1, the base station 105 transmits a standard HDP symbol 343 during the HDP period 531 of the cellular signal 505 at carrier frequency CF2, the base station 107 transmits a standard HDP symbol 343 during the HDP period 541 of the cellular signal 507 at carrier frequency CF3, and the base station 109 transmits a standard HDP symbol 343 during the HDP period 233 of the cellular signal 509 at carrier frequency CF1. The base stations gate their standard 1x pilot symbols and their traffic and overhead signals during each of their respective HDP periods. Although additional standard HDP symbols 343 are not shown as being transmitted during the portion of time illustrated, the general pattern is repeated in subsequent HDP cycles for the group of participating base stations.

As illustrated, when the base station 103 transmits the standard HDP symbol 343 during the HDP period 231 at the carrier frequency CF1, the base station 109 gates its standard 1x pilot symbol and its traffic and overhead channels and does not transmit a standard HDP symbol 343. The other base stations 105 and 107, however, do not gate their standard 1x pilot symbols and their traffic and overhead channels during the HDP period 231. Similarly, when the base station 105 transmits the standard HDP symbol 343 during its HDP period 531, none of the other base stations 103, 107 and 109 gate their standard 1x pilot symbols and their traffic and overhead channels at the same time. Similarly, when the base station 107 transmits the standard HDP symbol 343 during its HDP period 541, none of the other base stations 103, 105 and 109 gate their standard 1x pilot symbols and their traffic and overhead channels at the same time. Thus, during transmission of each HDP symbol, the standard 1x pilot symbol and the traffic and overhead channels on the other cellular signals being transmitted at different carrier frequencies are not gated. There is minimal interference, however, between an HDP symbol transmitted at one carrier frequency and the standard 1x pilot symbols and the traffic and overhead channels transmitted at different frequencies.

In the multicarrier configuration of FIG. 5, the PCG offset enables the mobile station 101 to track the enhanced HDPs with reduced HDP position delay and with higher accuracy. The mobile station 101 may be implemented as a single carrier terminal in which it is capable of tuning to only one carrier frequency at a time. Nonetheless, the mobile station 101 may receive the standard HDP symbol 343 on the cellular signal 503 from base station 103 during the HDP period 231 while being tuned to the carrier frequency CF1. Then, after a delay of $PCG_{OFF1}$, the mobile station 101 tunes to the second carrier frequency CF2 and receives the standard HDP symbol 343 on the cellular signal 505 from the base station 105. The mobile station 101 may then re-tune back to the first carrier frequency CF1 of the cellular signal 503 to maintain its communications with the base station 103. Further, the mobile station 101 may then tune to the third carrier frequency CF3 after a delay of $PCG_{OFF2}$ to receive the standard HDP symbol 343 on the cellular signal 507 from the base station 107. Then, the mobile station 101 may then re-tune back to the first carrier frequency CF1 of the cellular signal 503 to maintain communications. The mobile station 101 may then receives the standard HDP symbol 343 on the cellular signal 509 while remaining tuned to the first carrier frequency CF1.

In this manner, the mobile station 101 receives four different standard HDP symbols 343 from the four different base stations 103-109 within a single HDP cycle 221 for fast tracking time of arrival (TOA) or time difference of arrival (TDOA). The multicarrier configuration of FIG. 5 enables a faster and more accurate determination of a position estimate.

In an alternative embodiment, the mobile station 101 is configured as a multicarrier terminal in which it simultaneously tunes to multiple carrier frequencies (CF1, CF2, CF3, etc.) for receiving the HDP symbols transmitted on cellular signals at the different carrier frequencies without having to re-tune between the different carrier frequencies.

Figure 6:
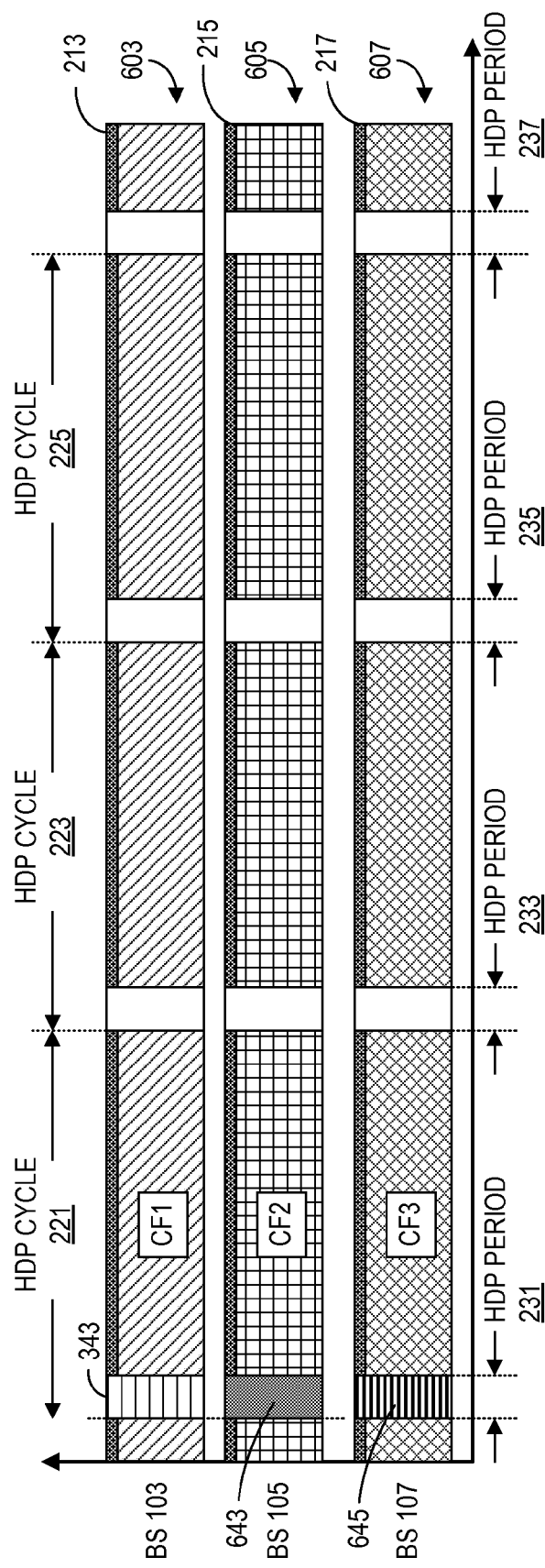
FIG. 6 is a timing diagram plotting four transmitted cellular signals by the base stations, respectfully, of FIG. 1 versus time incorporating enhanced HDP symbols implemented according to an embodiment of the present invention with multicarrier and chip and/or phase offset.

FIG. 6 is a timing diagram plotting transmitted cellular signals 603, 605 and 507 by the base stations 103-107, respectfully, versus time incorporating enhanced HDP symbols implemented according to an embodiment of the present invention with multicarrier and chip and/or phase offset. Again, the cellular signal 603 transmitted by the base station 103 is transmitted using a first carrier frequency CF1, the cellular signal 605 transmitted by the base station 105 is transmitted using a second carrier frequency CF2, and the cellular signal 607 transmitted by the base station 107 is transmitted by a third carrier frequency CF3. Additional base stations and carrier frequencies may be included. The cellular signals 603-607 are temporally synchronized and aligned with each other so that each includes the HDP cycles 221, 223, 225, etc., with generally aligned HDP periods 231, 233, 235, 237, etc. Similar to the embodiment shown in FIG. 5, the standard 1x pilot symbols 213, 215 and 217 are transmitted on the cellular signals 603, 605 and 607, respectively, but are gated during each HDP period as shown.

The first base station 103 transmits the standard HDP symbol 343 during the HDP period 231 of the first cellular signal 603. The second base station 105 also transmits a standard HDP symbol 643 during the HDP period 231 of the second cellular signal 605, except at a first sub-chip and/or phase offset. The third base station 107 also transmits a standard HDP symbol 645 during the HDP period 231 of the third cellular signal 607, except at a second sub-chip and/or phase offset. Each of the standard HDP symbols are shown with different shading patterns to distinguish the different sub-chip and/or phase offsets. The base stations 103-107 are shown gating their standard 1x pilot symbols and their traffic and overhead signals during the subsequent HDP periods 233, 235 and 237.

The additional sub-chip and phase offsets improve multipath resolution. The mobile station 101 in this case is configured as a multicarrier terminal in which it simultaneously tunes to multiple carrier frequencies for receiving the HDP symbols transmitted on different cellular signals. The multicarrier mobile station 101 reconstructs a multicarrier HDP on symbol of a much wider bandwidth using knowledge of the sub-chip offset and phase offset. The forward link (FL) position estimate using wide bandwidth HDP on symbols has a higher resolution with improved performance.

FIG. 7 is a diagram of information transmitted by the base station 103 to the mobile station 101 in an HDP parameters message for communicating multicarrier information. The HDP parameters message provides the mobile station 101 with the HDP channel transmit information for the sectors according to a multicarrier embodiment. The information is illustrated in tabular form including a first table 701, a second table 703 and a third table 705. Each of the tables 701-705 includes a field identifying the information type and a length of the value in bits. The value names and the bit length are arbitrary and alternative names and/or lengths are contemplated for different configurations. For the table 701, the PILOT_PN (pilot PN sequence offset index) (9 bits), CONFIG_MSG_SEQ (configuration message sequence number) (6 bits), HDP_PERIOD (period of HDP symbols) (2 bits), HDP_WALSH_COVER (index of length 64 Walsh cover for the HDP channel) (6 bits), and HDP_SECTOR_COUNT (number of records specifying sectors information) (7 bits) of table 701 are values sent according to a conventional configuration and are not further described. The HDP_SECTOR_COUNT specifies the number of occurrences of records containing the information in table 703 specifying sector information.

For the table 703, the HDP_PILOT_PN (the HDP PN offset the sector uses to transmit HDP channel) (9 bits), the PLANNED_OR_RANDOM_COLORING (set to '0' if the HDP_COLOR_OFFSET of this sector is assigned by planned coloring, and set to '1' if the HDP_COLOR_OFFSET of this sector is assigned by random coloring) (1 bit), HDP_COL-OR_OFFSET (omitted if the corresponding PLANNED_OR_RANDOM_COLORING is set to '1', and otherwise the base station sets this field to a value in the range from 0 to 8, inclusive) (0 or 4 bits), SEED_SAME_AS_PRE-VIOUS (omitted if the corresponding PLANNED_OR_RANDOM_COLORING is set to '0', otherwise, the base station sets this field to '1' if the previous sector uses random coloring and the HDP_CELL_SEED_PN and HDP_CELL_SEED_EXTRA for this sector are the same as that for the previous sector, otherwise, the base station sets this field to '0'; also, if this is the first sector using random coloring listed in this message, then the base station sets this field to '0') (0 or 1 bit), CELL_SEED_PN_SAME_AS_THIS_PN (omitted if the corresponding PLANNED_OR_RANDOM_COLOR-ING is set to '0' or SEED_SAME_AS_PREVIOUS is set to '1', otherwise, the base station sets this field to '1' if the HDP_CELL_SEED_PN for this sector is the same as the HDP_PILOT_PN field in this record, otherwise, the base station sets this field to '0') (0 or 1 bit), HDP_CELL_SEED_PN (omitted if the corresponding PLANNED_OR_RANDOM_COLORING is set to '0' or SEED_SAME_AS_PREVIOUS is set to '1' or CELL_SEED_PN_SAME_AS_THIS_PN is set to '1', otherwise, the base station sets this field to the HDP_CELL_SEED_PN for this sector; for all sectors in a cell, the HDP_CELL_SEED_PN field is the same) (0 or 9 bits), HDP_CELL_SEED_EXTRA (omitted if the corresponding PLANNED_OR_RANDOM_COLORING is set to '0' or SEED_SAME_AS_PREVIOUS is set to '1', otherwise, the base station sets this field to a 4-bit HDP_CELL_SEED_EXTRA number for the sector; all sectors in a cell have the same HDP_CELL_SEED_EXTRA) (0 or 4 bits), and HDP_SECTOR_INDEX (omitted if the corresponding PLANNED_OR_RANDOM_COLORING field is set to '0' or HDP_CELL_SEED_PN is the same as HDP_PI-LOT_PN, otherwise, the base station sets this field to an index for this sector in the cell; if this field is omitted, the sector index is assumed to be zero) (0 or 3 bits) are values sent according to a conventional configuration and are not further described.

Table 703 includes two additional values which are not included in the conventional configurations. Table 703 includes additional fields MULTICARRIER_SUPPORT (1 bit) and MULTICARRIER_COUNT (1 bit). MULTICARRI-ER_SUPPORT indicates whether the base station supports any of the multicarrier configurations as described herein. The MULTICARRIER_COUNT specifies the number of occurrences of records containing the information in table 705. For table 705, CDMA_CHANNEL_NUMBER (2 bits) is a value that indicates the carrier frequency employed by the base station. PCG_OFFSET (2 bits), CARRIER_PHASE_OFFSET (6 bits), and CHIP_OFFSET (6 bits) are values that indicate the PCG offset, the phase offset and the chip offset, respectively, used by the base station.

FIG. 8 is a table 803 similar to table 703 transmitted by the base station 103 to the mobile station 101 in the HDP param-eters message to provide the mobile station 101 with the HDP channel transmit information for the sectors according to an alternative multicarrier embodiment. In a similar manner, the HDP_SECTOR_COUNT of table 701 specifies the number of occurrences of records containing the information in table 803 specifying sector information. Similar to table 703, the HDP_PILOT_PN, the PLANNED_OR_RANDOM_COL-ORING, HDP_COLOR_OFFSET, SEED_SAME_AS_PREVIOUS, CELL_SEED_PN_SAME_AS_THIS_PN, HDP_CELL_SEED_PN, HDP_CELL_SEED_EXTRA, and HDP_SECTOR_INDEX fields and val-ues are repeated according to the conventional configuration.

In this case, the specific multicarrier information is calcu-lated using minimum values provided in table 803 and the frequency information of each carrier provided in the CDMA channel list which is transmitted from the base station to the mobile station 101. The CDMA channel list includes the carrier frequency information in the form of {f1, f2, f3, . . . , fN} for an integer number of "N" sectors. The multicarrier information is accessed based on offsets calculated from off-set values provided in table 803. Table 803 includes a MUL-TICARRIER_MIN_PCG_OFFSET (4 bits), a MULTICAR-RIER_MIN_PHASE_OFFSET (6 bits), and a MULTICARRIER_MIN_CHIP_OFFSET (6 bits), which are the actual offsets for the first frequency f1. The PCG offset, the phase offset and the chip offset of carrier frequency f2 is 2·MULTICARRIER_MIN_PCG_OFFSET (in which "·" denotes multiplication), 2·MULTICARRIER_MIN_PHASE_OFFSET, and 2·MULTICARRIER_MIN_CHIP_OFFSET, respectively. For any given frequency "x" within the CDMA channel list, the PCG offset, the phase offset and the chip offset of carrier frequency f2 is x·MULTICARRIER_MIN_PCG_OFFSET, x·MULTICARRIER_MIN_PHASE_OFFSET, and x·MULTICARRIER_MIN_CHIP_OFFSET, respectively.

FIG. 9 is a table 903 similar to table 703 transmitted by the base station 103 to the mobile station 101 in the HDP param-eters message to provide the mobile station 101 with the HDP channel transmit information for the sectors according to another alternative multicarrier embodiment. In a similar manner, the HDP_SECTOR_COUNT of table 701 specifies the number of occurrences of records containing the informa-tion in table 903 specifying sector information. Similar to table 703, the HDP_PILOT_PN, the PLANNED_OR_RAN-DOM_COLORING, HDP_COLOR_OFFSET, SEED_SAME_AS_PREVIOUS, CELL_SEED_PN_SAME_AS_THIS_PN, HDP_CELL_SEED_PN, HDP_CELL_SEED_EXTRA, and HDP_SECTOR_INDEX fields and val-ues are repeated according to the conventional configuration.

In this case, table 903 provides 3 values including MUL-TICARRIER_SUPPORT indicating whether the base station supports the multicarrier configuration, MULTICARRIER_PATTERN provides an offset pattern that specifies how the HDP will be transmitted in the multiple carrier frequencies, and MULTICARRIER_CHANNELS indicates which chan-nels are involved in the offset pattern. The pattern may be fixed or variable (or random). If the pattern is fixed, then the offset between two different carrier frequencies of the same base station site are set to n·offset, in which "n" is a positive integer in which n=1, 2, 3, etc. If random, then "n" may vary.

Figure 10:
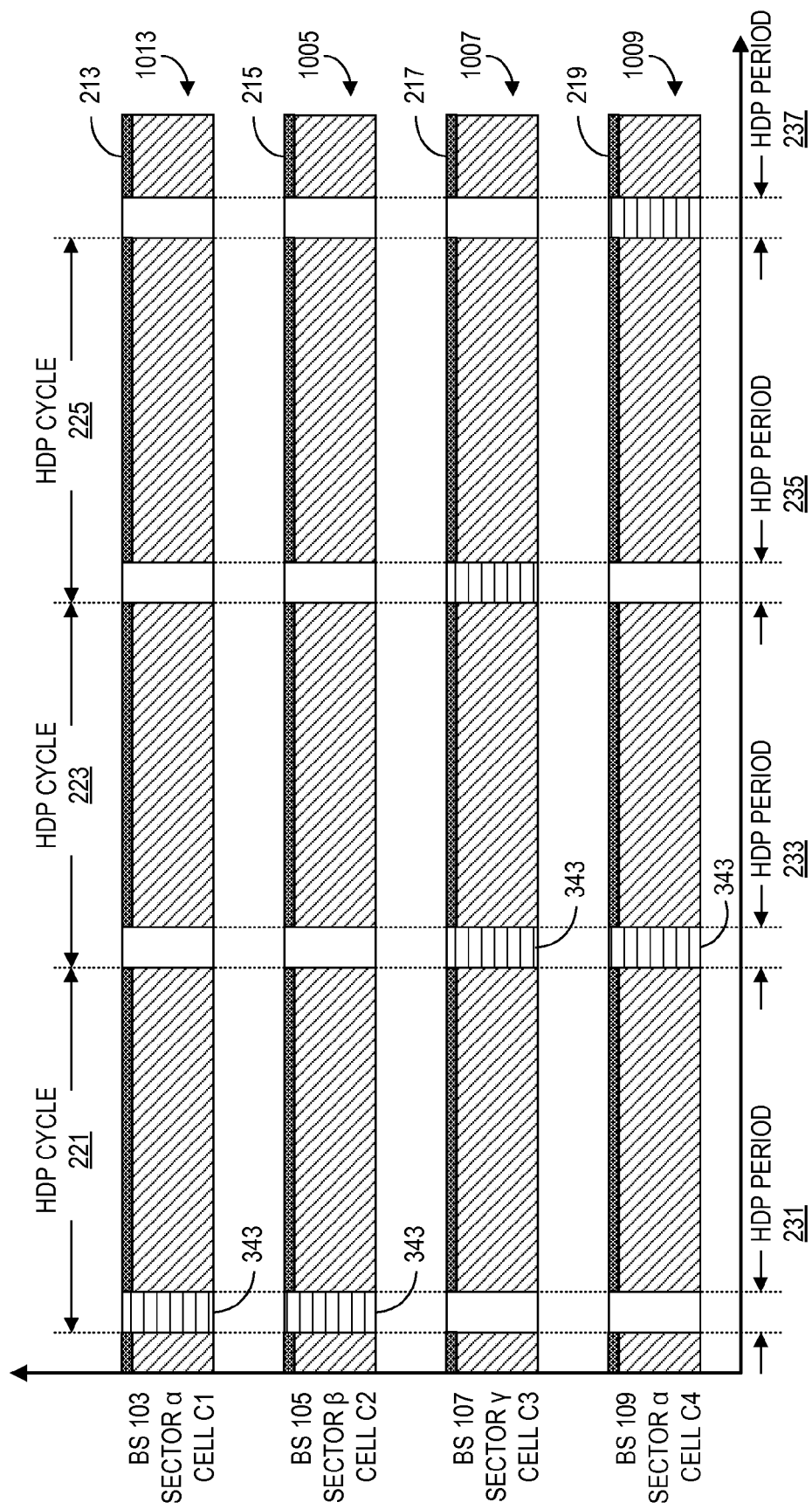
FIG. 10 is a timing diagram plotting four transmitted cellular signals by the base stations, respectfully, of FIG. 1 versus time incorporating enhanced HDP symbols implemented according to another embodiment of the present invention for a single-carrier, multiple HDP configuration.

FIG. 10 is a timing diagram plotting four transmitted car-rier signals 1003, 1005, 1007 and 1009 (1003-1009) by the base stations 103-109, respectfully, versus time implemented according to another embodiment of the present invention for a single-carrier, multiple HDP configuration. The base sta-tions 103-109 may be located on different cell towers and transmitting in one of three different sectors α, β, and γ denoting different directions. The base stations 103 and 109 are located on cell towers 1 and 4 (C1, C4) and transmitting in the same direction α, the base station 105 is located on a cell tower 2 (C2) and is transmitting in direction β, and the base station 107 is located on a cell tower 3 (C3) and is transmitting in direction γ. Each of the cellular signals 1003-1009 have temporally aligned HDP periods 231, 233, 235, etc., for synchronous HDP cycles 221, 223, 225, etc., in a similar manner previously described. Similar to the embodiment shown in FIG. 5, the standard 1x pilot symbols 213-219 are transmitted on the cellular signals 1013-1009, respectively, and the standard 1x pilot symbols and traffic and overhead signals are gated for each of the HDP periods.

In this case, however, multiple base stations transmit the standard HDP symbol 343 at the same time. As shown, the base stations 103 and 105 transmit the standard HDP symbol 343 during the HDP period 231 on the same carrier frequency while the base stations 107 and 109 gate their standard 1x pilot symbols and their traffic and overhead channels. The base stations 107 and 109 transmit the standard HDP symbol 343 during the HDP period 233 on the same carrier frequency while the base stations 103 and 105 gate their standard 1x pilot symbols and their traffic and overhead channels. The base stations 103-109 gate their standard 1x pilot symbols and their traffic and overhead channels during the HDP periods 235 and 237.

Single-carrier, multiple HDP configurations may have an issue of position delay. More hearability usually means more delay. Multiple HDP symbols being simultaneously transmitted inside the network allows the mobile station 101 to track two reference base stations at the same time. Due to excessive spreading gain of about $1.25 \times 1228.8 = 1536$ chips, the resulting SNR loss of such simultaneous transmission is trivial.

For sectors-based HDP for the 3 different directions $\{\alpha, \beta, \gamma\}$ for multiple cell towers $\{C1, C2, C3, \ldots\}$, due to the application of directional antennas for each sector, one HDP cycle can be used for a corresponding directional sector sets, e.g., $\{C1/\alpha, C2/\alpha, C3/\alpha, C4/\alpha, \ldots\}$. This means that for any given HDP transmission, three HDP symbols may be transmitted in three different directions.

A system and method of enhanced pilots for improved mobile station positioning as described herein improves upon the conventional HDP approach at reduced cost while providing backwards compatibility with conventional or legacy mobile stations.

Those skilled in the art should appreciate that they can readily use the disclosed conception and specific embodiments as a basis for designing or modifying other structures for carrying out the same purposes of the present invention, and that various changes, substitutions and alterations can be made herein without departing from the scope of the invention as defined by the appended claims.

What is claimed is:

1. A method of enhancing transmission of highly detectable pilots, comprising:
   transmitting, by at least one base station, at least one cellular signal wherein each cellular signal comprises repetitive HDP cycles in which each HDP cycle has a duration of N power control groups and includes an HDP period having a duration of M power control groups, and wherein N and M are positive integers in which N is greater than M;
   during said transmitting, gating traffic and overhead channels during each HDP period of each HDP cycle of each cellular signal; and
   during said transmitting, transmitting an enhanced HDP symbol during a selected HDP period for each set of X HDP cycles of each cellular signal, wherein X is a positive integer.

2. The method of claim 1, wherein said transmitting at least one cellular signal comprises transmitting a plurality of cellular signals by a corresponding plurality of base stations, wherein the HDP periods of the plurality of cellular signals are temporally aligned with each other, and wherein only one base station transmits an enhanced HDP symbol at a time.

3. The method of claim 2, wherein said transmitting a plurality of cellular signals comprises continuously transmitting a standard 1x pilot symbol on each of the plurality of cellular signals.

4. The method of claim 3, wherein said transmitting an enhanced HDP symbol comprises increasing a power level of the standard 1x pilot symbol.

5. The method of claim 3, wherein said transmitting an enhanced HDP symbol comprises transmitting a standard HDP symbol in addition to the standard 1x pilot symbol.

6. The method of claim 3, further comprising gating the standard 1x pilot symbol for a next HDP period after an HDP period in which the enhanced HDP symbol is transmitted for at least one of the at least one cellular signal.

7. The method of claim 1, further comprising continuously transmitting a standard 1x pilot symbol on each of the at least one cellular signal except gating the standard 1x pilot symbol during each HDP period.

8. The method of claim 1, wherein said transmitting at least one cellular signal comprises transmitting a plurality of cellular signals at a corresponding plurality of different carrier frequencies at a corresponding plurality of different power control group offsets by a corresponding plurality of base stations.

9. The method of claim 8, wherein said transmitting a plurality of cellular signals comprises transmitting at least two cellular signals at the same carrier frequency with temporally aligned HDP periods by at least two base stations, wherein only one of the at least two base stations transmits an enhanced HDP symbol at a time.

10. The method of claim 1, wherein said transmitting at least one cellular signal comprises transmitting a plurality of cellular signals at a corresponding plurality of different carrier frequencies at a corresponding plurality of different subchip and phase offsets by a corresponding plurality of base stations.

11. The method of claim 10, wherein said plurality of cellular signals comprise HDP periods which are temporally aligned with each other.

12. The method of claim 1, wherein said transmitting at least one cellular signal comprises transmitting a plurality of cellular signals at a common carrier frequency at a corresponding plurality of different sector directions by a corresponding plurality of base stations.

13. The method of claim 12, wherein said plurality of cellular signals comprise HDP periods which are temporally aligned with each other and wherein at least two of said base stations transmit corresponding enhanced HDP symbols simultaneously during temporally aligned HDP periods.

14. A wireless communication system, comprising:
   at least one base station that is configured to transmit at least one cellular signal, wherein each cellular signal comprises repetitive HDP cycles in which each HDP cycle has a duration of N power control groups and includes an HDP period having a duration of M power control groups, wherein N and M are positive integers in which N is greater than M;
   wherein said at least one base station is configured to gate traffic and overhead channels during each HDP period of each HDP cycle of said at least one cellular signal; and
   wherein said at least one base station is configured to transmit an enhanced HDP symbol during a selected HDP period for each set of X HDP cycles of said at least one cellular signal, in which X is a positive integer.

15. The wireless communication system of claim 14, wherein said at least one base station is configured to continuously transmit a standard 1x pilot symbol on said at least one cellular signal.

16. The wireless communication system of claim 15, wherein said at least one base station is configured to gate said continuously transmitted standard 1x pilot symbol during each HDP period of each HDP cycle of said at least one cellular signal.

17. The wireless communication system of claim 15, wherein said at least one base station is configured to transmit said enhanced HDP symbol by boosting a power level of the 1x pilot symbol.

18. The wireless communication system of claim 15, wherein said at least one base station is configured to transmit said enhanced HDP symbol by transmitting a standard HDP symbol in addition to said standard 1x pilot symbol.

19. The wireless communication system of claim 15, wherein said at least one base station is configured to gate the standard 1x pilot symbol for a next HDP period after an HDP period in which said enhanced HDP symbol is transmitted on said at least one cellular signal.

20. The wireless communication system of claim 14, wherein said at least one base station is configured to transmit said at least one cellular signal at a second carrier frequency at a power control group offset relative to a first carrier frequency.

21. The wireless communication system of claim 14, wherein said at least one base station is configured to transmit said at least one cellular signal at a second carrier frequency at a chip and phase offset relative to a first carrier frequency.

22. The wireless communication system of claim 14, wherein said at least one base station comprises a plurality of base stations transmitting a plurality of cellular signals at a common carrier frequency at a corresponding plurality of different sector directions, wherein each of said plurality of cellular signals comprises repetitive HDP cycles in which each HDP cycle has a duration of N power control groups and includes an HDP period having a duration of M power control groups, wherein said HDP periods of said plurality of cellular signals are temporally aligned with each other.

23. The wireless communication system of claim 22, wherein at least two of said plurality of base stations transmit corresponding enhanced HDP symbols simultaneously during temporally aligned HDP periods.

\* \* \* \* \*